(12) United States Patent
Fine et al.

(10) Patent No.: US 6,275,933 B1
(45) Date of Patent: Aug. 14, 2001

(54) SECURITY SYSTEM FOR A COMPUTERIZED APPARATUS

(75) Inventors: Michael Fine, South Ogden; Randy Rollins, West Jordan, both of UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/303,341

(22) Filed: Apr. 30, 1999

(51) Int. Cl.[7] .................................................. G06F 9/00
(52) U.S. Cl. .................................. 713/2; 713/200
(58) Field of Search ........................... 713/2, 200, 202

(56) References Cited

U.S. PATENT DOCUMENTS

| | | | |
|---|---|---|---|
| 5,012,514 | * | 4/1991 | Renton ...................................... 380/4 |
| 5,448,045 | * | 9/1995 | Clark ...................................... 235/382 |
| 5,832,214 | * | 11/1998 | Kikinis ................................. 713/202 |
| 5,892,906 | * | 4/1999 | Chou et al. ........................... 713/202 |
| 5,949,882 | * | 9/1999 | Angelo .................................... 380/25 |
| 6,216,230 | * | 4/2001 | Rallis et al. .......................... 713/185 |

* cited by examiner

Primary Examiner—Dennis M. Butler
(74) Attorney, Agent, or Firm—Workman, Nydegger & Seeley

(57) ABSTRACT

In order to boot a portable computer, a smart key is required to be inserted into a PCMCIA card of the portable computer. Firmware in the PCMCIA card verifies that a smart key has been inserted. The portable computer will boot only when two conditions are met. The first condition is that the smart key, the PCMCIA card, and the portable computer all contemporaneously have the matching codes stored therein. The second condition is that the first condition is met and that a new random generated and encrypted code is successfully stored in each of the smart key, the PCMCIA card, and the portable computer. Until these two conditions are met, the portable computer will not boot. Once booted, access to certain coded files on the portable computer is denied if respective matching codes in the coded files are not also contained in the smart key. Also, the portable computer will not exit an idle, sleep, or power conservation mode until the two conditions are met. Also disclosed are an inventive apparatus and system including a smart key, an ASIC analogous to the PCMCIA card, and a computerized apparatus analogous to the portable computer, where the foregoing two conditions must be met before a user gains access to the computerized apparatus. Contemplated computerized apparatus include PDAs, copy machines, facsimile machines, standalone modems, mobile telephones, pagers, televisions, and automobiles.

20 Claims, 10 Drawing Sheets

SECURITY SYSTEM FOR A COMPUTERIZED APPARATUS

BACKGROUND OF THE INVENTION

1. The Field of the Invention

The present invention relates to systems to prevent unauthorized access to computer systems and is more particularly related to a physical key system that is used to gain access to a computerized apparatus.

2. Present State of the Art

There is an increasing dependency upon computers to assist in daily affairs of both businesses and individuals. This dependency creates within computerized systems a vast array of public and private data storage. The storage of private data of a sensitive nature necessitates a focused effort within security systems to prevent unauthorized access to computers so as to prevent any invasion of the privacy of the data therein. In addition to the protection of the privacy of data in stored in a computer system, there is also a need to prevent access to general purpose computers as well as computerized machines such as cellular phones, personal digital assistants, pagers, televisions, and automobiles. When a security system is present in general purpose computers and computerized machines, not only is there a prevention of unauthorized use and access but there is also realized a crime deterrent in that, should the machine be stolen, the machine will be of no use unless the security system can be breached.

Mechanical security measures, such as locks and keys, are known for prevention of access to machinery. Lock and key security systems present a crime deterrent in a well understood visual stigma of difficulty of access. Electrical security measures, such as those requiring passwords and user identification codes, have been used in the past by users to obtain and prevent entrance through a security system associated with general purpose computers and computerized machines. As to the former, mechanical lock and key systems can be overcome by locking picking devices as well as by force. As to the latter, the benefit of the security system is lost when the access codes are found out or otherwise known by an unauthorized party. Thus, what is needed is a system and apparatus for providing security of access to a general purpose computer or a computerized machine that combines both mechanical and electrical security measures in an implemented electronic technique that improves upon that which is lacking in each these measures.

SUMMARY AND OBJECTS OF THE INVENTION

It is, therefore, an object of the present invention to provide a visual and electronic access deterrent to a general purpose computer or computerized machine.

It is a further object of the present invention to provide a visual access deterrent to a general purpose computer or computerized apparatus that requires a user to possess a physical key having an electronic component in order to gain access.

It is a still further object of the present invention to provide an access deterrent to a general purpose computer or computerized machine that requires a user to possess a physical key having an electronic component therein in order to gain access thereto after entry thereof into a conservation mode.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein, a system and apparatus for improving upon secure access to a general purpose computer or computerized machine is presented. The inventive apparatus includes a computerized apparatus that has a program memory means and a processing means. The program memory means stores one or both of a BIOS and an operating system, or an equivalent. The processing means is electrically connected to the program memory means and executes the BIOS and the operating system.

The inventive apparatus also includes a security interface device in electrical communication with the computerized apparatus. Included in the security interface device is a universal connector for receiving a physical connection to a cable, a program storage means for storing a plurality of cable identification codes, a processing means electrically connected to the program storage means and the universal connector means for receiving a cable identification signal from the universal connector means and comparing the signal to the cable identification codes stored in the program storage means, a read only memory containing a first identification code, and a random access memory containing a second identification code.

In addition to the foregoing, the inventive apparatus also includes a security access device that includes a read only memory containing a first identification code and a cable identification code, a means for communicating the cable identification code in a cable identification signal to the universal connector means, a random access memory containing a second identification code, and a universal connector for operably and detachably connecting the security interface device to the security interface device.

The inventive system begins execution when power is supplied to the inventive apparatus and when the processing means of the security interface device receives a cable identification signal from the universal connector means. When the cable identification signal matches a cable identification code that is stored in the program storage means of the security interface device, this is an indication that a proper security cable has been inserted at the universal connector means. If there is a match of the cable identification code, the processing means of the computerized apparatus loads and executes the BIOS.

When the BIOS executed, the first and second identification codes are read from the security interface device and the security access device. Then, a first comparison of the first and second identification codes from the security interface device is made, respectively, to the first and second identification codes from the security access device. When the first comparison is not a match, the BIOS prevents the booting of the hardware computer device.

When the first comparison is a match, and when the BIOS has stored therein a first and a second identification code, the processing means reads the first and second identification codes from each of the security interface device, the security access device, and the BIOS. Then, the processing means performs a second comparison of the first and second identification codes, respectively, among each of the security interface device, the security access device, and the BIOS. When the second comparison is a match, said BIOS initiates the loading of the operating system.

Once the loading of the operating system is initiated and when the second comparison is a match, the processing means reads the first and second identification codes from each of the security interface device, the security access device, BIOS, and the operating system, and then does a third comparison of the first and second identification codes, respectively, among each of the security interface device, the security access device, the BIOS, and the operating system. When the third comparison is a match, the processing means generates a random number, encrypts the random number, and stores the result in the second identification code of each of the security interface device, the security access device, the BIOS, and the operating system. When the encrypted random number has been successfully stored, the loading of the operating system is completed, and a diagnostic is output, such as a light emitted from an LED on the security access device, indicating that the security access device can be optionally removed from the security interface device without interrupting the loading of the operating system. Until the operating system is finished loading a user is prevented use of or access to most of the functions of the general purpose computer or the computerized apparatus.

Once the operating system is finished loading and a period of time passes, the inventive apparatus, in an embodiment such as a general purpose computer, may enter into a idle, sleep, or power conservation mode. The inventive system prevents the inventive apparatus from exiting the idle, sleep, or power conservation mode unless certain conditions are met. These conditions include the processing means reading the first and second identification codes from each of the security interface device, the security access device, BIOS, and the operating system, and the processing means performing a comparison of the first and second identification codes, respectively, among each of the security interface device, the security access device, the BIOS, and the operating system. When this comparison is a match, the processing means generates a random number, encrypts the random number, and stores the result in the second identification code of each of the security interface device, the security access device, the BIOS, and the operating system. When the encrypted random number is stored, the inventive system permits the inventive apparatus to exit the idle, sleep, or power conservation mode. Until these conditions are met, the conservation mode is not exited and a user is prevented access to most of the functions of the general purpose computer or the computerized apparatus.

In the event that a user has lost or otherwise misplaced the security access device, an alternative method of access to the computerize apparatus is available to the user. The alternative method involves the user making specific input to the computerized apparatus in a particular predetermined sequence. Upon verification of users' input sequence, the operating system loads and the user has access to the computerized apparatus.

These and other objects and features of the present invention will be more fully apparent from the following description and appended claims, or may be learned by the practice of the invention as set forth herein.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described,and explained with additional specificity and detail through the use of the accompanying drawings in which.

DETAILED DESCRIPTION OF THE PREFERRED EMBODIMENTS

Figure 1:
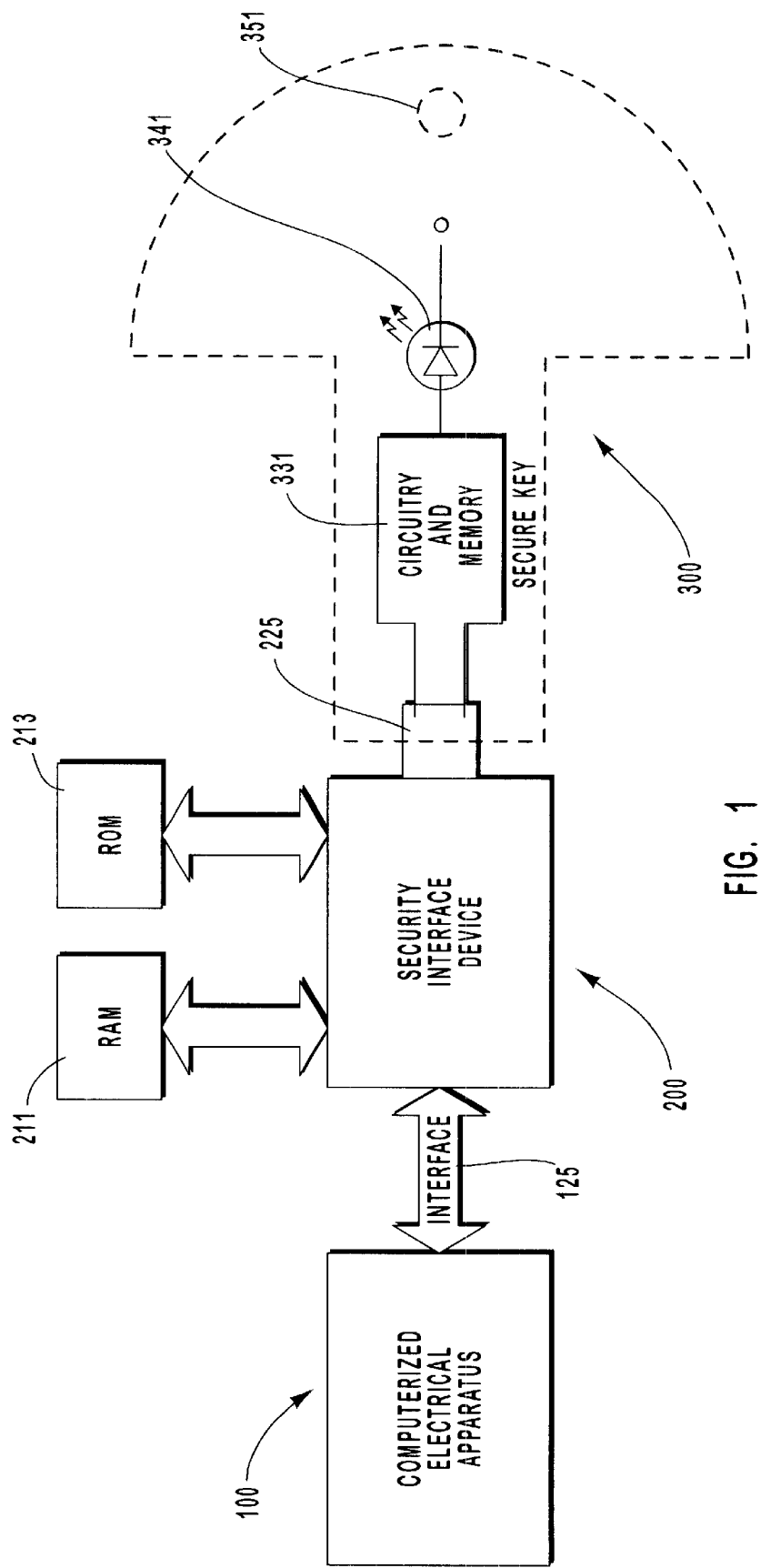
FIG. 1 is a top level block diagram depicting a computerized electrical apparatus interfacing with a interface device, the interface device having inserted therein a secure key.

Referring to FIG. 1, an overall block diagram is depicted of a security interface system to a computerized electrical apparatus. The security interface system comprises a computerized electrical apparatus 100 that interfaces through interface 125 to a security interface device 200. Interface 125 is the means by which the security interface device 200 communicates with computerized electrical apparatus 100 to which security interface device 200 is attached.

Security interface device 200 can be configured in a wide variety of form factors. For example, in one embodiment security interface device comprises a communication card carried internal to a computer or other peripheral. In another embodiment, security interface device 200 comprises a small form factor communication card which can be carried internal to a portable laptop, notebook or other portable computer. One such form factor which may be utilized in low power portable applications is the PCMCIA card form factor which can embody multiple functions, including at least one of a modem and an adaptor circuit for connecting the PCMCIA card to a network of computers (e.g. a LAN or a WAN).

In still another embodiment, security interface device 200 comprises a separate communication card which is attached external to the computer or other peripheral. In yet another embodiment, security interface device 200 comprises an Application Specific Integrated Circuit (ASIC) specifically designed to receive an interface with a physical connection to a reprogrammable security key and also designed to electrically communicate through interface 125 to computerized electrical apparatus 100.

Security interface device 200 also includes a universal connector means. The universal connector means is the means by which a secure key can be attached to security interface device 200. By way of example, and not limitation, in FIG. 1 the universal connector means is depicted as universal connector 225. In one preferred embodiment, universal connector 225 comprises a multi-conductor connector, such as a Registered Jack connector (e.g. RJ-14), a Recommended Standard connector (e.g. RS-232), or a 15 pin connector (e.g. HD 15). Any multi-conductor connector which has sufficient conductors to carry the signals needed to interface with a security key 300 may be utilized for universal connector 225. Security interface device 200 includes volatile and non-volatile memory in the form of random access memory (RAM) 211 and read only memory (ROM) 213.

Security key 300 has an ASIC in the form of a circuity and memory 331. Circuitry and memory 331 supplies power to an LED 341. LED 341 serves a diagnostic purpose in use of security key 300. A hole or conduit 351 is physically situated in security key 300 and serves the purpose of an attachment to a lanyard, key chain, or other convenience to a user who will carry security key 300 on their person.

In use, security key 300 may contain a flash ROM in circuitry and memory 331 that will allow the storage of a randomly generated character code (RGCC). Also stored in circuitry and memory 331 are an identification code (IDC) that is a unique code, having a length of 8 characters or less, that is programmed into the circuitry and memory 331. The IDC is preferably unencrypted and is made available to an end user for security purposes. Also stored within circuitry and memory 331 is a code identifying security key 300 as a security key.

Security interface device 200 may contain software that has been written onto ROM 213, also called firmware. ROM 213 can be a programmable read only memory or a flash memory that can be erased and reprogrammed. In application, the secure key interface system depicted in FIG. 1 provides key-level security through secure key 300, security interface device security through security interface device 200, BIOS-level security through software built into computerized electrical apparatus 100, and operating system-level security through a security application program that runs on computerized electrical apparatus 100.

Computerized electrical apparatus 100 generally has a memory to store, at least temporarily data and programs. Computerized electrical apparatus 100 may also have a mass storage device such as disk drives and tape drives. Input devices, such as a keyboard, mouse, or microphone serve as a conduit through which data and instructions can be input to computerized electrical apparatus 100. Computerized electrical apparatus 100 may include an output device. A CPU or central processing unit is the heart of computerized electrical apparatus 100 which executes software, including a BIOS, an operating system, a security application program, and other application software.

Computerized electrical apparatus 100 may be a PDA having handwriting recognition using a stylus in a pen-based system or may be hand-held PC, a palmtop computer, a copier, a facsimile transreceiving machine, or another electrical device that may have the foregoing components.

Computerized electrical apparatus 100 includes in storage a BIOS which is built in software which determines what computerized electrical apparatus 100 can do without accessing programs from a main storage means. On computerized electrical apparatus 100, the BIOS contains all of the code required to control input, output, storage, serial communications, and a number of miscellaneous functions. The system BIOS of computerized electrical apparatus 100 is the lowest-level software in the computer aspect thereof. Primarily, the BIOS acts as an interface between the hardware (especially a chipset and a CPU or processor of computerized electrical apparatus 100) and an operating system of computerized electrical apparatus 100. The BIOS provides access to the system hardware and enables the execution of the higher-level operating system that is used to run application programs on computerized electrical apparatus 100. When computerized electrical apparatus 100 is a personal computer, the BIOS is built-in software that determines what the personal computer (PC) can do without accessing programs from a disk. On PCs, the BIOS contains all the code required to control the keyboard, display screen, disk drives, serial communications, and a number of miscellaneous functions.

Preferably, the BIOS in computerized electrical apparatus 100 is placed in a ROM chip or the like that comes with the computer aspect of computerized electrical apparatus 100. This ensures that the BIOS will always be available despite hardware failure in the main storage part of computerized electrical apparatus 100. The BIOS makes it possible for computerized electrical apparatus 100 to boot itself. Most preferably, computerized electrical apparatus 100 has a flash BIOS, meaning that the BIOS has been recorded in a flash memory chip, which can be updated if necessary.

The operating system of computerized electrical apparatus 100 is kept in storage. When executing, the operating system performs basic tasks in electrical apparatus 100, such as recognizing input from input devices and sending output to output devices, keeping track of data stored on storage means associated with computerized electrical apparatus 100, and controlling any peripheral devices such as storage means and output devices.

It is contemplated that computerized electrical apparatus 100 will have a great variety of operating systems depending on the type of device that computerized electrical apparatus 100 represents. For instance, it is contemplated that the operating system for computerized electrical apparatus 100 can be for a general purpose computer so as to provide a software platform on top of which other programs, such as application programs, can run. Contemplated operating systems include DOS, OS/2, Windows, LINUX, Windows CE, and various expert system or electrical device operating systems such as are common to computerized apparatus including Personal Digital Assistants (PDAs), copy machines, facsimile machines, standalone modems, cellular telephones, pagers, televisions, and automobiles.

Other levels of security are contemplated for the security interface system depicted in FIG. 1. Specifically, an application-level security feature is contemplated in which all levels of security are periodically monitored during operation of computerized electrical apparatus 100, given certain conditions, so that proper access and use of computerized electrical apparatus 100 is periodically and consistently monitored. Additionally, a file-level security is contemplated in which individual data files stored in computerized electrical apparatus 100 are encrypted. These encrypted files are accessible only to a user having a IDC corresponding to a specified algorithm for security. As such, software in computerized electrical apparatus 100 verifies that the IDC is in an authentication table stored in computerized electrical apparatus 100. Multiple IDCs for multiple users are contemplated to be stored in the authentication tables. As such, users may specify additional authorized IDCs if access is to be permitted to various encrypted files by the added users.

In use, a user will boot computerized electrical apparatus by some sort of manual intervention, such as pushing an ON or START switch. The switch initiates an internal power supply that turns on and initializes. A processor in computerized electrical apparatus 100 executes a BIOS boot program generally in a predetermined location in a BIOS ROM where the BIOS boot program is stored. The BIOS runs a variety of tests and may direct output to output devices which may be associated with computerized electrical apparatus 100 as peripherals. The BIOS may perform a system inventory to determine what sort of hardware is in the system as well as do other tests. The BIOS will locate interface 125. Through interface 125, the BIOS may provide power to security interface device 200 and will activate firmware therein. The firmware in security interface device 200 will determine that security key 300 is connected through universal connector 225 and will query the contents of circuit and memory 331 as well as its own memory in RAM 211 and ROM 213. This cable identification procedure is disclosed in U.S. Pat. No. 5,649,001 issue to Thomas et al. on Jul. 15, 1997, titled "Method and apparatus for adapting a communication interface device to multiple networks", which is incorporated herein by reference.

Finally, the storage associated with the BIOS in computerized electrical apparatus will be queried. The result of these queries will be a comparison of the IDC and the RGCC to determine that they are the same in each of the BIOS memory of computerized electrical apparatus 100, the memory of security interface device 200, and the memory of security key 300. Until this determination has been made, the user will be denied access to the BIOS, all storage means associated with computerized electrical apparatus 100 as well as any other peripheral device or port attached thereto, and all input/output device on computerized electrical apparatus 100.

Once the match between the codes and the BIOS, the security interface device 200, and the security key 300 has been made, the BIOS may output diagnostics on an output device and then will begin searching for a storage location in which a boot program is located. Having identified this boot storage location, the BIOS looks for boot information to start the operating system boot process. Once the BIOS finds the operating system boot information, the BIOS starts the process of booting the operating system using the information in the boot storage location. Once the storage devices associated with the computerized electrical apparatus are available to the processor of computerized electrical apparatus 100, a operation-level security program is loaded that will use pre-defined software in the security interface device 200 to enable security interface device 200 an perform another sequence verification of the IDC and the RGCC. The operating system-level security software has a table that contains the information about the IDC, and that also contains the last-known RGCC in an encrypted form. The IDC is embedded in the table of the operating system-level software in an unencrypted form. The operating-level system software has the IDC embedded therein at the time of installation of an embodiment of the inventive security system. A verification procedure then proceeds in which the IDC and RGCC in each of the operating system of computerized electrical apparatus, the memory of security interface device 200, and the memory of secure key 300 are all checked for a match. If there are any differences between the three locations and the two codes, computerized electrical apparatus 100 is prevented from completing the boot operation that is underway. Once this verification is complete, the software generates a new RGCC by way of a random number generator and an encryption application. Then, the new encrypted RGCC is updated in the operating system table, the BIOS-level application table, the memory of the security interface device 200, and the circuity and memory 331 of security key 300. Until the update is complete, the user is denied access to the operating system, to all files on storage associated with computerized electrical apparatus 100 or any peripheral thereof, as well as access to any input/output devices associated with computerized electrical apparatus 100. Once the update has been made, an LED 341 on security key 300 is illuminated, indicating that security key 300 can be removed from its place in universal connector 225 without interrupting the boot operation.

While computerized electrical apparatus 100 is executing application-level programs, the IDC stored in the table of the operating system is queried with each file access operation to determine whether the file requested to be accessed is permissible. This level of permissibility is checked by way of an authentication table in which files are associated with certain IDCs. This authentication table is a level of security that executes only when specified and will prevent access to files specifically coded in the authentication table to be associated with an IDC that is not that of the user's IDC. As a further security measure, files in the authentication table associated with a particular IDC are encrypted.

Figure 2A:
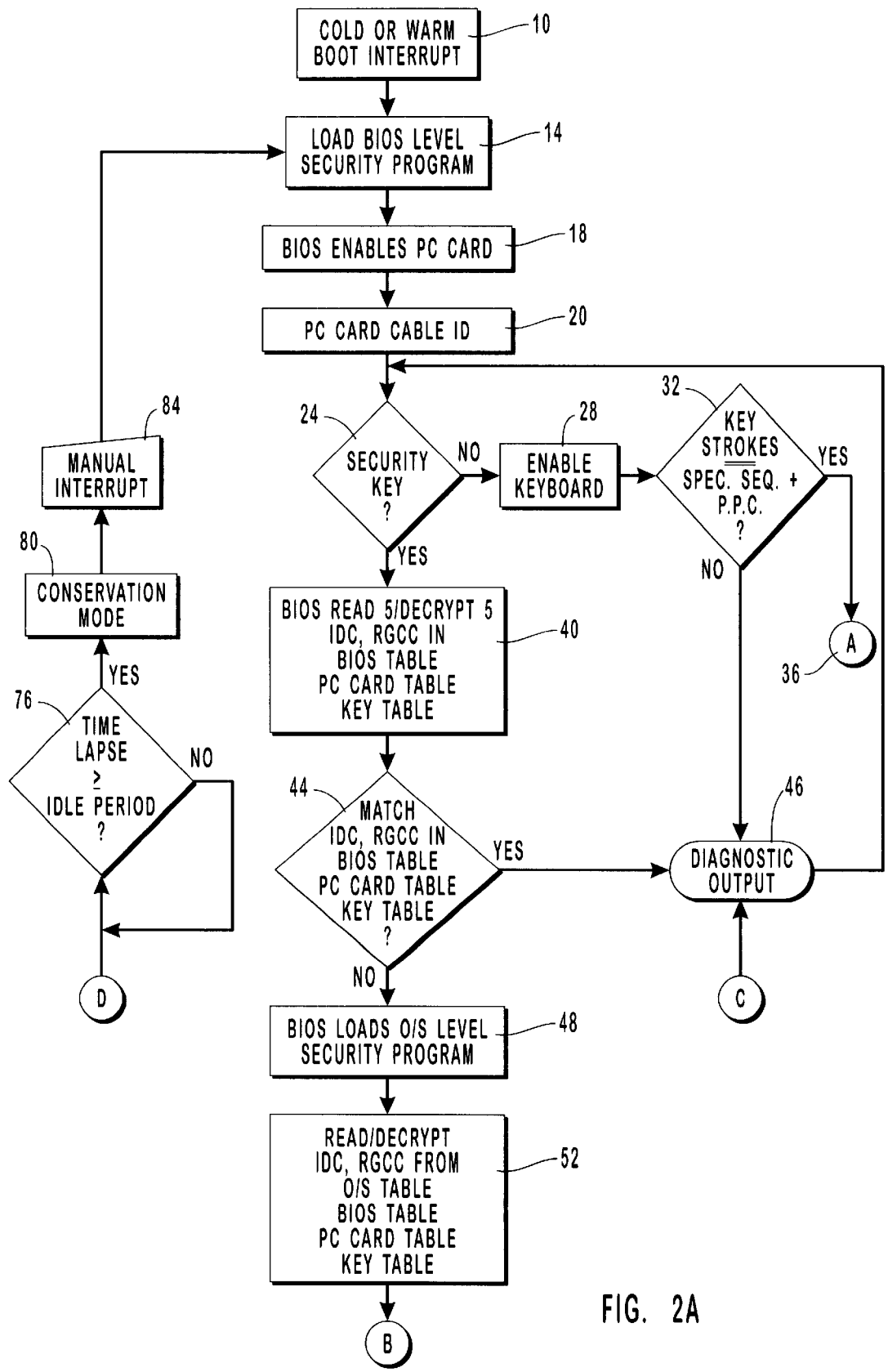
FIG. 2 is a flowchart of steps performed by an embodiment of the inventive system executed by a general purpose computer.
Figure 2B:
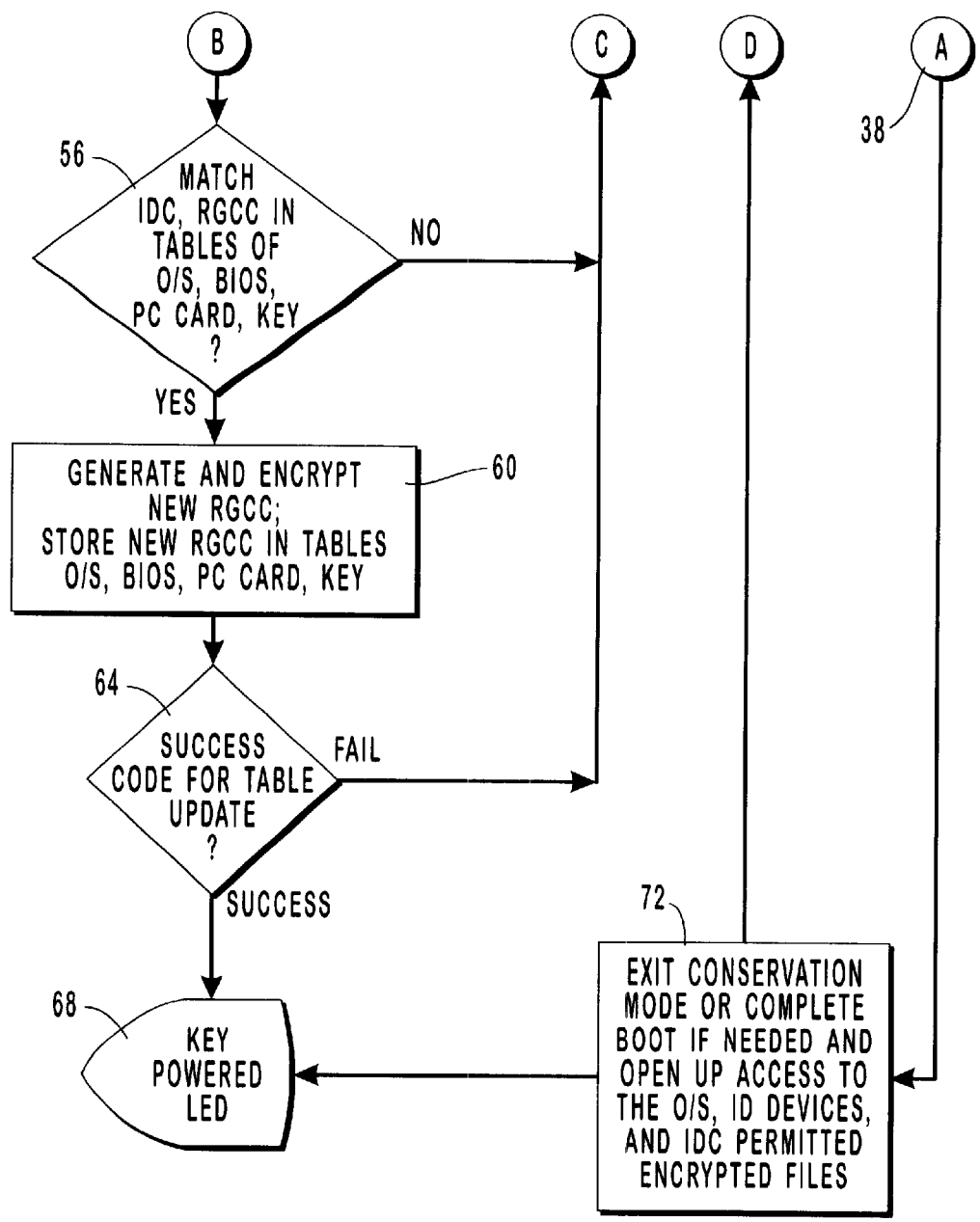

FIG. 2 represents a flowchart of an embodiment of the inventive system as is carried out in a general purpose computer having a thin-architecture PC card capable of attachment to a secure key, where the PC card is a small card about the size of a credit card and conforming to the PCMCIA standard. The flowchart depicts in block form a variety of sequenced steps that are performed by the inventive system.

In Step 10 of FIG. 2, a user initiates by way of manual intervention a warm or cold boot. The manual intervention in Step 10 causes a BIOS level security program to load at Step 14. At Step 18, the BIOS enables the PC card. The enabled PC card executes a software program from the firmware therein that enables the PC card to identify cables or other connectors that have been inserted into the PC card. Specifically, the software is looking for a secure key to be inserted in the PC card. At Step 24, the PC card software verifies that a secure key has been inserted in the PC card. In the event that a secure key is not detected by the PC card firmware program, the keyboard of the PC is enabled at Step 28 and at Step 32 a determination is made as to whether certain keystrokes have been made as input on the keyboard. These specific keystrokes represent a "back door." The back door is a provision of the software that enables a user who has lost or misplaced their security key to still gain access to the system. The keystrokes that are expected to be made by the user to gain access to the system are a command key and a code that is a Personal Protection Code (PPC). The PPC is the back-up code to get around the security if the user happens to lose their security key or an information system department need access to the system, or in some other situation where the secure key is not available for use. The PPC is established by the user and preferably is changed with the configuration software for the secure key system. If the proper keystrokes are detected on the keyboard, the program proceeds to Step 36 and from there to Step 38. If, however, the proper keystrokes are not detected as input at the keyboard, then a diagnostic message is output, audibly or visibly, from the PC card at Step 46 at which point the user has not gained access to the general purpose computer and control passes to Step 24.

Assuming that the insertion of a secure key is detected at Step 24, the program proceeds to Step 40 where the BIOS of the general purpose computer reads the IDC and reads and decrypts the RGCC in the BIOS table, in the PC card table, and in the secure key table. A comparison is made at Step 44 to determine that the IDC and RGCC in each of the tables is a match. If not, a diagnostic of a visual and/or audible nature is made at Step 46. The result of such a diagnostic is a return to Step 24. If a match of the IDC and the RGCC exists in each of the three tables, the process proceeds to Step 48 where the BIOS loads the operating-level security program.

The operating-level security program at Step 52 causes a table in the operating system to be read. The table in the operating system includes an unencrypted IDC and an encrypted last known RGCC. Additionally, the RGCC and the IDC is read from each of the tables or stored in the BIOS table, the PC card table, and the secure key table. At Step 56, the IDC and the RGCC in each of the tables of the operating system, the BIOS, the PC card, and the secure key are compared to see if a match exists. If a match does not exist, a diagnostic output of an auditory and/or visible nature is made at Step 46, then control returns to Step 24. If a match is deemed to have been met, then control moves to Step 60 where a new code is generated by a random number generator in the computerized electrical apparatus which is then encrypted and stored in four locations. The four locations that the new encrypted RGCC is stored in are the table in the operating system, the table in the BIOS, the table in the PC card, and the table in the secure key. If for some reason the new encrypted RGCC is not successfully stored in the four tables, this failure is detected at Step 64 and control passes to Step 46 where an auditory or visual diagnostic is output from the PC card. If the update is successful, control is passed to Step 68 where a visual diagnostic, such as an illuminated LED on the secure key, is output and control in the security program passes to Step 72.

At Step 72, the boot strap operation of the computerized electrical apparatus is completed and access to the system is opened up as to the operating system, the I/O devices, whichever files are unencrypted, and only those files that have been encrypted that are associated with the user's IDC through an authentication table stored in the general purpose computer. At Step 76, a period of time passes during which the general purpose computer or PC is idle. By way of example and not by way of limitation, the PC may enter a sleep mode or a screen saver mode which is a form of power or resource conservation. In the event that this conservation mode is entered by way of an expiration of a predetermined time, then control passes to Step 80 where the conservation mode is entered into. In order to exit the conservation mode, a user will make a manual input at Step 84 by way of, for instance, moving the mouse of the computer, depressing a key or key sequence on the keyboard, or pressing a reset button on the PC. In any of these cases, control passes to Step 14 for a repeat of the foregoing sequence.

A modification of the foregoing sequence following execution of Step 84 is that at Step 72, the conservation mode will be exited upon proper verification of security as given by the foregoing steps. As such, either the conservation mode will be exited or the operating system will continue its boot operation at Step 72, depending on the circumstance. Nevertheless, an ongoing security operation has been proposed by this preferred embodiment in which security is maintained from the initial cold boot of the general purpose computer, through file security during execution of application programs based upon the IDC of a user, as w ell as when the general purpose computer enters a power or resource conservation mode from which the user must reassert authorization by an inserted security key into the PC card so as to fulfill each of the steps that have been described in conjunction with FIG. 2.

Figure 3:
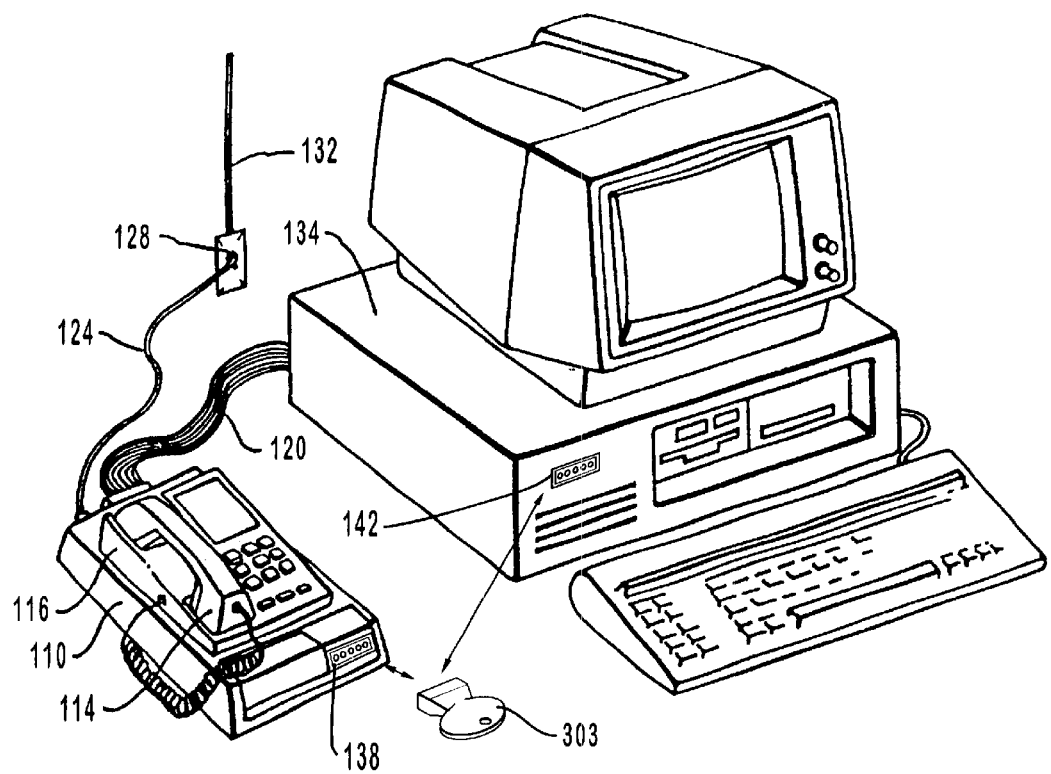
FIG. 3 is a perspective view of a desktop PC having an external modem associated therewith, where either the desktop PC or the external modem has a slot for the insertion therein of a secure key or secure key cable.

FIG. 3 is a perspective view of a desktop PC having an external modem associated therewith, where either the desktop PC or the external modem has a slot for the insertion therein of a secure key. A modem 110 is shown near a telephone base 116 which cradles a telephone receiver 114. Modem 110 is electrically connected to the telephone with a telephone extension line utilizing electrical/physical media connectors at each end. Signals transmitted by a modem at a remote location are received over a telephone line 124. An RJ-11 physical/electrical media connector 128 is used to physically and electrically connect telephone extension line 124 to telephone line 132. Another RJ-11 connector is used to connect extension line 124 to modem 110.

Modem 110 converts the modem frequency signal back to binary digital data characters. The digital characters are then transmitted through a multiplexed cable 120 to an import port of a receiving desktop computer 134. A DAA circuit is located within modem 110 at the point where the modem interfaces with telephone extension line 124. At this location, the DAA circuit isolates the modem and the computer from disturbances coming in or going out over the telephone line. An embodiment of the secure key is seen at reference numeral 303. Secure key 303 can be inserted into an input slot 138 on modem 110 or can be inserted into an insert slot 142 on desktop computer 134.

By way of comparison of FIG. 3 to FIG. 1 where insert slot 138 on modem 110 is used for the insertion therein of secure key 303, then secure key 303 represents secure key 300 in FIG. 1, insert slot 138 represents universal connector 225 in FIG. 1, modem 10 represents security interface device 200 in FIG. 1, interface 125 in FIG. 1 is represented by multiplexed cable 120, and computerized electrical apparatus 100 is represented by desktop computer 134 in FIG. 1.

By way of comparison of FIG. 3 to FIG. 1 where insert slot 142 on desktop computer 134 is used for the insertion therein of secure key 303, then computerized electrical apparatus 100 and security interface device 200 of FIG. 1 are both meant to be represented as being contained within and the functions thereof to be performed by desktop computer 134.

Figure 4:
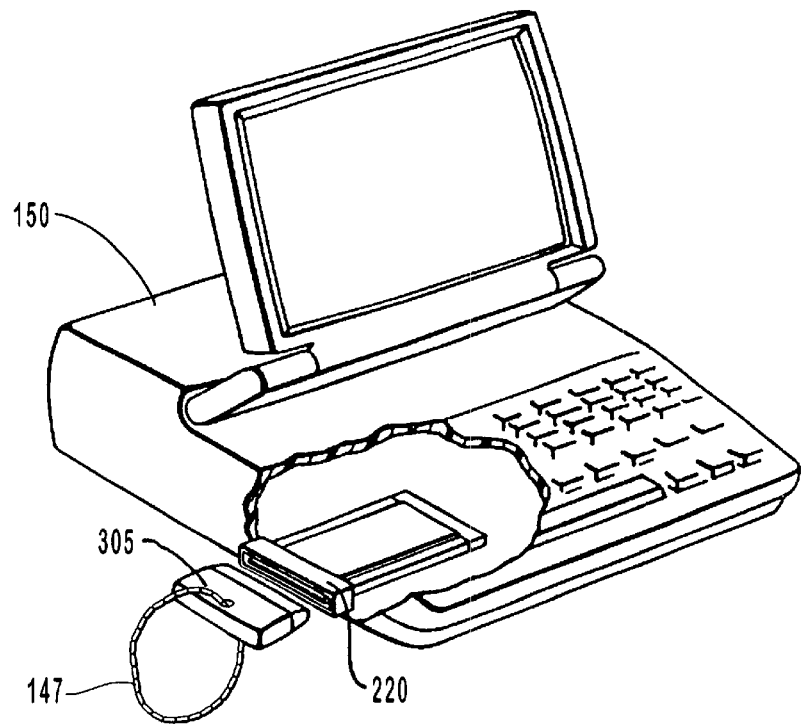
FIG. 4 is a partially cut away perspective view of a portable computer having installed therein a thin-architecture PC card capable of attachment to a secure key.

FIG. 4 depicts a down-sized computer, such as a notebook or laptop computer, seen as a portable computer 150. Portable computer 150 typically weighs less than 6 pounds and is small enough to easily fit in a conventional briefcase. A PC card 220 terminates at an insert slot on the side of portable computer 150. A secure key 305 having a key chain or lanyard 147 is in a position permitting insertion of secure key 305 into the insert slot of PC card 305.

As computer housings have continued to be down-sized, internal spatial restrictions have required the establishment of standards for the internal accessories of the computer. One set of standards applicable to memory cards has been developed by the Personal Computer Memory Card Industry Association (PCMCIA). The PCMCIA standard determines that the spatial standard for all memory cards used in down-sized computers should be restricted to a rectangular space approximately 55 mm in width, 84 mm in length, and 5 mm in depth. These standards, current and future, are referred to herein as "thin-architecture" standards.

Figure 5:
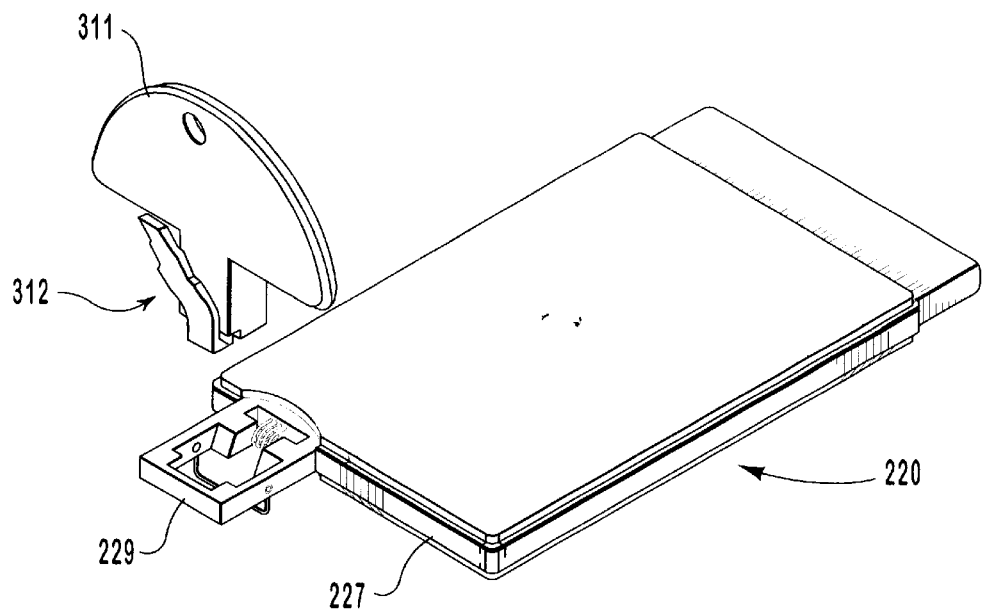
FIG. 5 is a perspective view of one embodiment of a retractable aperture block mounted to a PC card and a smart key in a position for insertion into the aperture.

FIG. 5 illustrates a thin-architecture PC card 220 having an aperture block 229 projecting from surface 227 of PC card 220. A secure key 311 having a physical/electrical media connector 312 is also illustrated. Media connector 312 has a portion thereof that is resiliently biased upon insertion into aperture block 229. Aperture block 229 has electrical conductors therein for making an electrical connection with electrical conductors in media connector 312, thereby representing an embodiment of universal connector 225 seen in FIG. 1.

Figure 6:
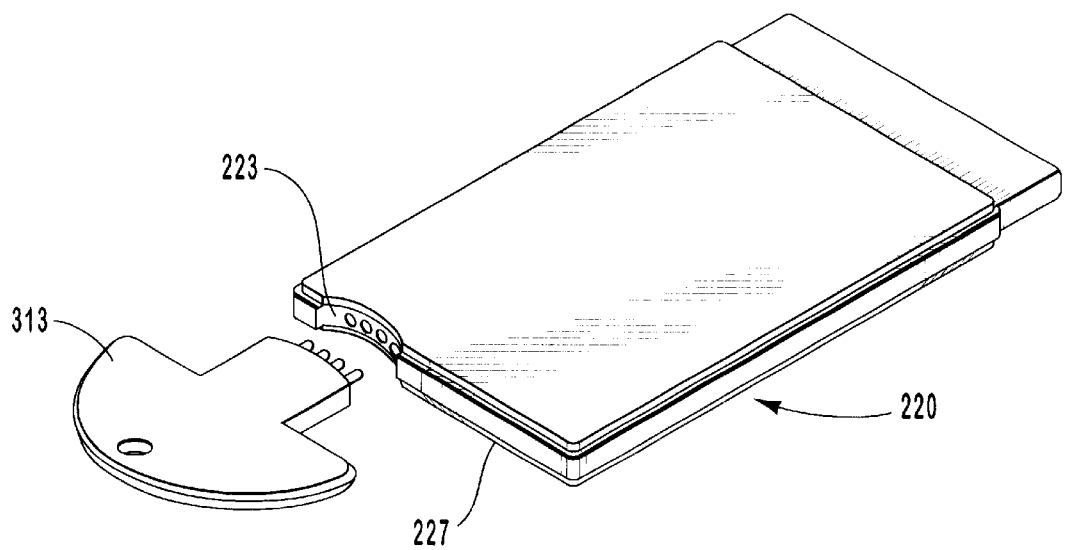
FIG. 6 is a perspective view of a PC card incorporating an aperture block and a smart key in a position for insertion into the aperture.

FIG. 6 shows a PCMCIA card 220 having a recessed insertion slot therein at reference numeral 223 which is designed to receive male prongs projecting from a secure key 313. Secure key 313 also has an LED or other display means for producing a visual diagnostic, and may also include a perforation or conduit therethrough for the insertion therein of a lanyard or key chain.

Figure 7:
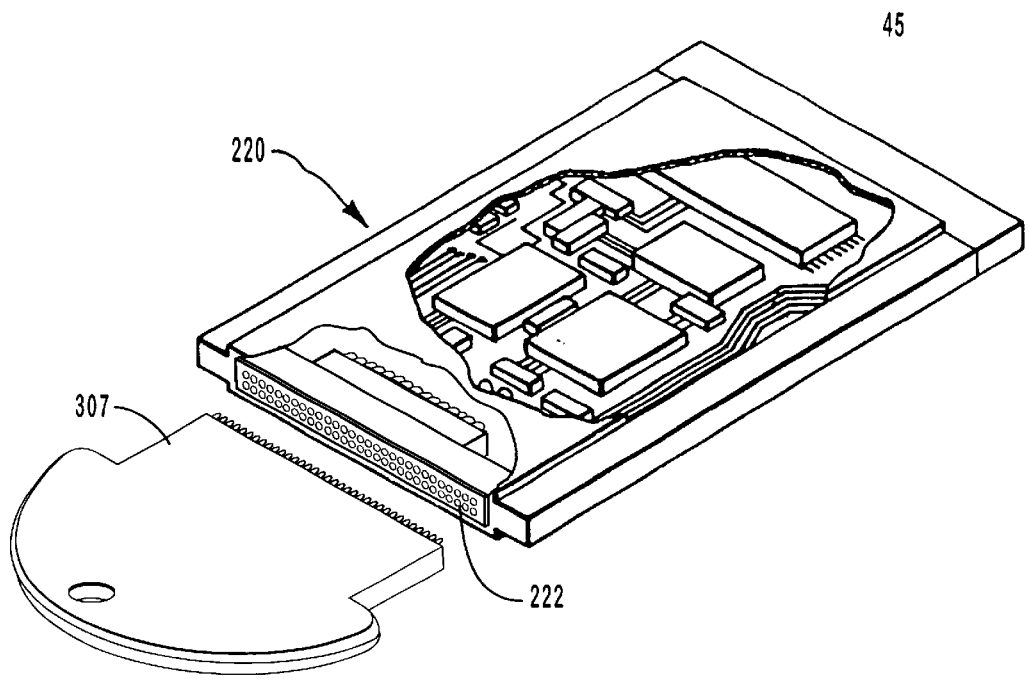
FIG. 7 is a partially cut away perspective view of a thin-architecture PC card incorporating a recessed aperture and a smart key in a position for insertion into the aperture.

FIG. 7 shows a perspective partial cut away view of a thin-architecture PC card or PCMCIA card 220 having a female insertion slot therein at reference numeral 222 which is designed to receive male prongs projecting from a secure key 307 to make an electrical connection between PCMCIA card 220 and secure key 307. Secure key 307 also has an LED or other display means for producing a visual diagnostic, and may also include a perforation or conduit therethrough for the insertion therein of a lanyard or key chain.

Figure 8:
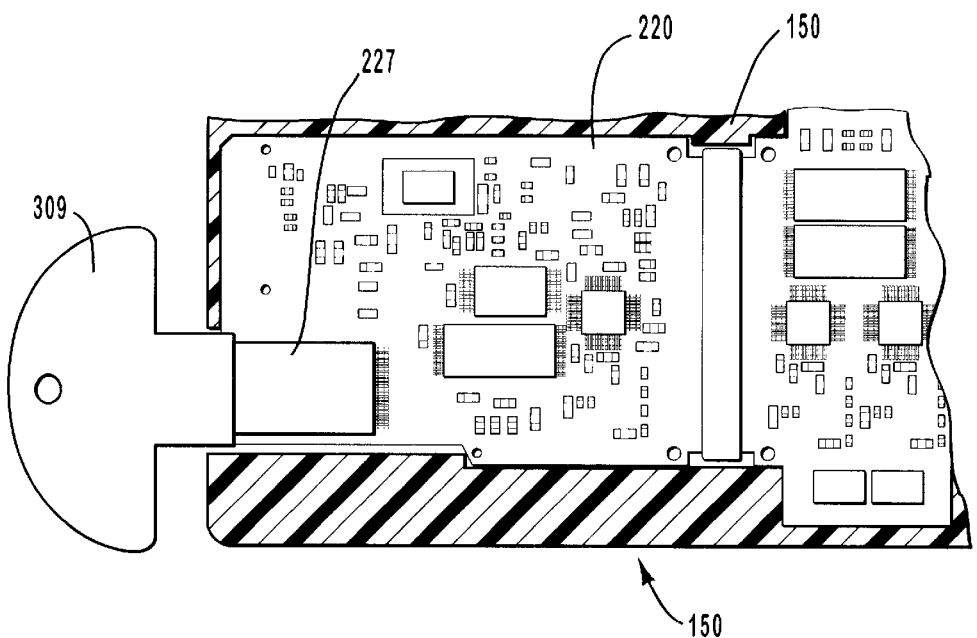
FIG. 8 is a top plan partial cut away view of a PCMCIA or other thin-architecture architecture card inserted within a portable computer, where a secure key is in an insertion position within an insert slot of the PCMCIA card.

FIG. 8 is a top plan partial cut away view of a PCMCIA or other thin-architecture card 220 inserted within a portable computer 150, shown in cut away, where a secure key 309 is inserted into an insert slot structure 227 of a PC card 220 so as to establish electrically connected interfaces between PC card 220 and secure key 309 and between PC card 220 and portable computer 150.

FIGS. 9 through 14 each depict a security system for a computerized apparatus in which a security key cable is used by a user to gain access to and use of the computerized apparatus. Each computerized apparatus includes an electronic memory for storin an operating system, a plurality of cable identification codes, a first identification code, and a second identification code. Also included in the computerized apparatus is a universal connector for receiving and making an electrical connection to a cable, and an electronic processor electrically connected to the electronic memory for executing the operating system. The processor is also electrically connected to the memory and the universal connector for receiving a cable identification signal from the universal connector and comparing a code carried in the signal to the cable identification codes stored in the memory.

The security key cable seen in each of FIGS. 9 through 14 each include an electronic memory for storing a first identification code, a second identification code, and a cable identification code. Also included in the security cable key is a universal connector for operably and detachably connecting the security key cable to the universal connector of the computerized apparatus, and circuitry for communicating the cable identification code in the memory of the security key cable via a cable identification signal to the universal connector of the security key cable.

In the operation of each of the security systems depicted in FIGS. 9 through 14, the electronic processor receives a cable identification signal from the universal connector of the electronic processor carrying a code that matches a cable identification code that is stored in the memory of the computerized apparatus. When there is a match, the electronic processor reads the first and and second identification codes from each of the memory of the computerized apparatus and the security key cable and performs a comparison of the first and second identification codes from the computerized apparatus, respectively, to the first and second identification codes from the security key cable to determine if there is a match. When the comparison is a match, the electronic processor generates a random number, encrypts the random number, and stores the encrypted random number in the second identification code of each of the memory of the computerized apparatus and the memory of the security key cable. Then, the processor completes the loading of the operating system. If, however, the comparison is not a match, the processor will not complete the loading of the operating system.

Each security key cable depicted in FIGS. 9–14 has a diagnostic output device, such as an LED, that is in electrical communication with the circuitry of the security key cable. When foregoing the comparison results in a match and the processor completes the loading of the operating system, the circuitry of the security key cable initiates an output at the diagnostic output device of the security key cable, such as an illumination of the LED. When so illuminated, the user can interpret the illumination as a sign the access has been gained to the computerized apparatus and that the secure key cable can be removed without interrupting the loading of the operating system.

Once a user has gained access to the computerized apparatus, data that is stored in files on a magnetic media storage device in the computerized apparatus can conditionally be accessed. Each file has a first identification code which is compared to that of the memory of each of the computerized apparatus and the security key cable. The user is permitted access only to those files having a matching first identification code.

Figure 9:
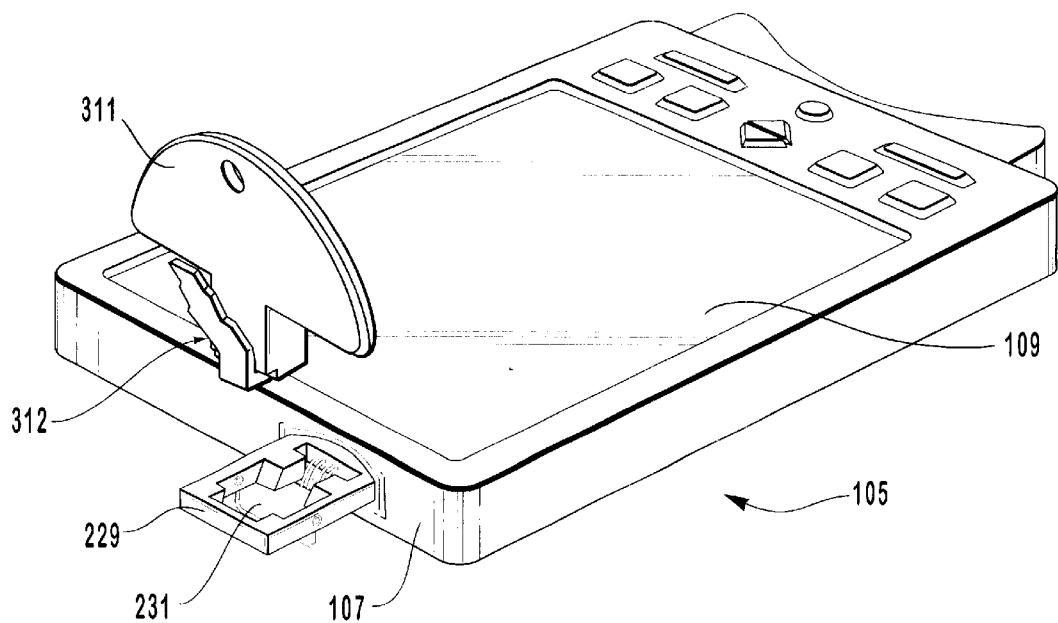
FIG. 9 is a perspective view of a personal digital assistant which incorporates a retractable aperture block and a smart key in a position for insertion into the aperture.

Depicted in FIG. 9 is a computerized electrical apparatus 105. In one embodiment, computerized electrical apparatus 105 is a PDA having in electrical storage a casing 107 both a BIOS and an operating system. Projecting from casing 107 is an aperture block 229 which is retractable into casing 107 and is in electrical communication with the internal circuitry of computerized electrical apparatus 105. Extending through aperture block 229 is an aperture 231 having electrical conductors at a periphery thereof. A secure key 311 has a resilient connector 312 which is inserted in aperture 231 of retractable aperture block 229 so as to be resiliently held therein. When secure key 311 is inserted in aperture block 231 an electrical connection is made therebetween. Computerized electrical apparatus 105 features input keys and a display screen 109 which will receive input also by way of a manually manipulated stylus upon display screen 109. As such display screen 109 is touch sensitive so as to make input to computerized electrical apparatus 105.

Figure 10:
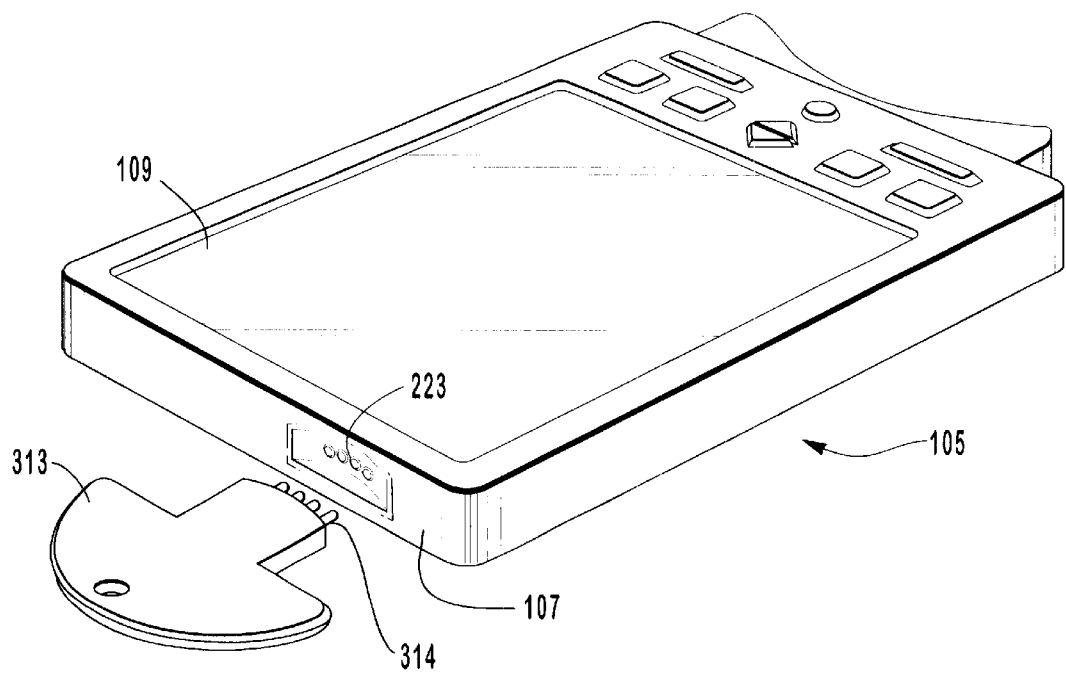
FIG. 10 is a perspective view of a personal digital assistant which incorporates a recessed aperture and a smart key in a position for insertion into the aperture.

FIG. 10 is a modification of FIG. 9 in that an insertion slot 223 is recessed within casing 107 of computerized electrical apparatus 105. In use, male prongs 314 of secure key 313 are inserted into insertion slot 223. When so inserted, an electrical communication is facilitated between secure key 313 and computerized electrical apparatus 105 and the code matching and updating security criteria disclosed herein are performed.

Depicted in FIGS. 11–14 are alternative embodiments of computerized electrical apparatus 100 seen in FIG. 1, each having inserted therein and being in electrical communication with alternative embodiments of secure key 300 seen in FIG. 1, where the secure key has been inserted into the respective insertion slots of each of the computerized electrical apparatus. The computerized electrical apparatus depicted therein are provided by example and in no way limit the scope of the contemplated computerized apparatus. In each case, the computerized electrical apparatus have electrically stored therein one or both of a BIOS and an operating system, or equivalents thereof. Importantly, a user is preventing from access to most, or optionally selected, functions of the computerized electrical device until a secure key is physically and electrically in communication with the computerized electrical apparatus and the code matching and updating security criteria disclosed herein are met.

Figure 11:
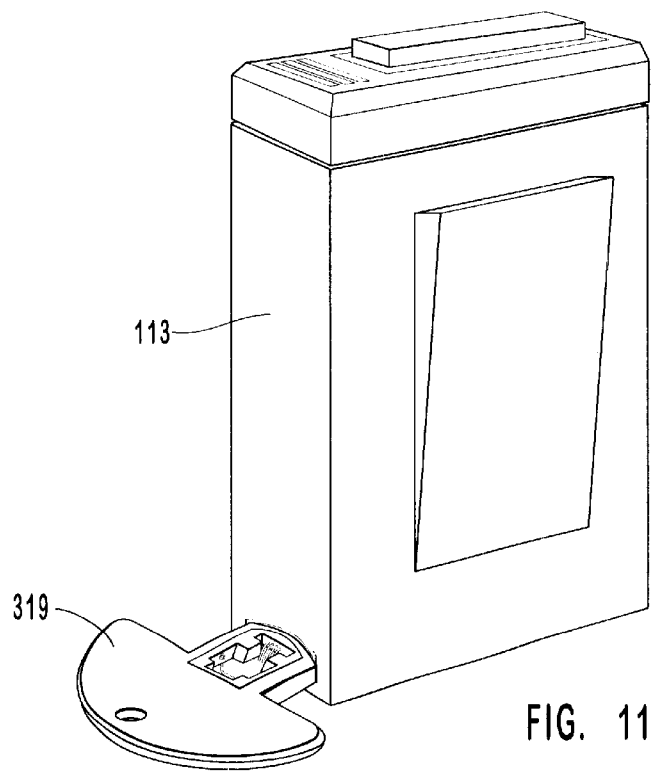
FIG. 11 is a perspective view of a secure key inserted into an insert slot of a pager.
Figure 12:
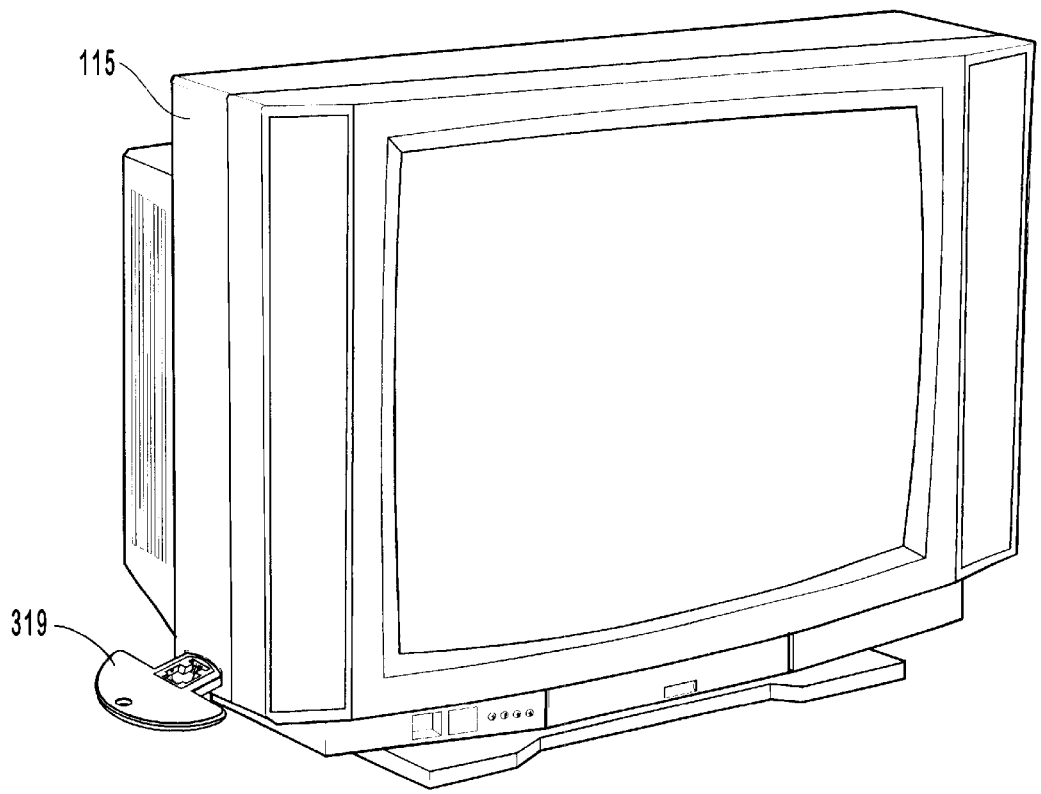
FIG. 12 is a perspective view of a secure key inserted into an insert slot of a television.
Figure 13:
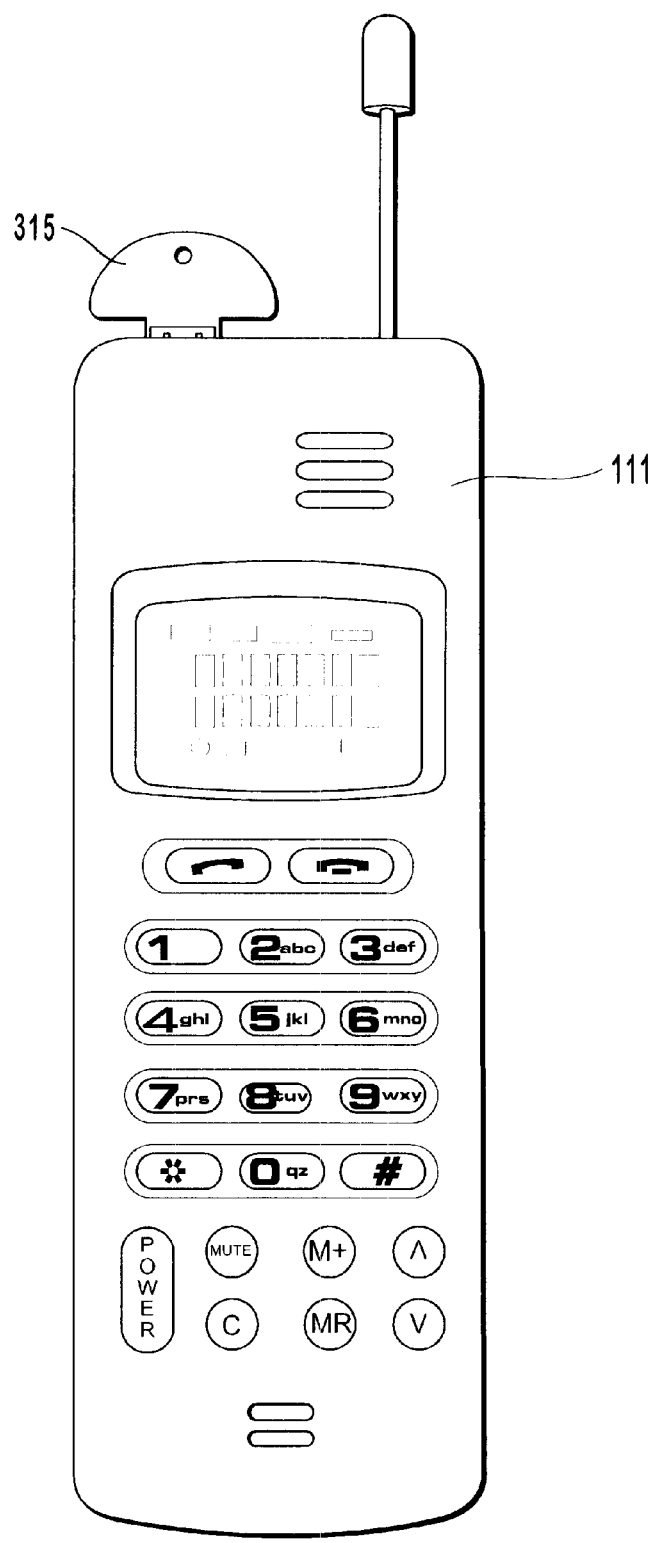
FIG. 13 is a top elevational view of a secure key inserted into an insert slot of a mobile telephone.
Figure 14:
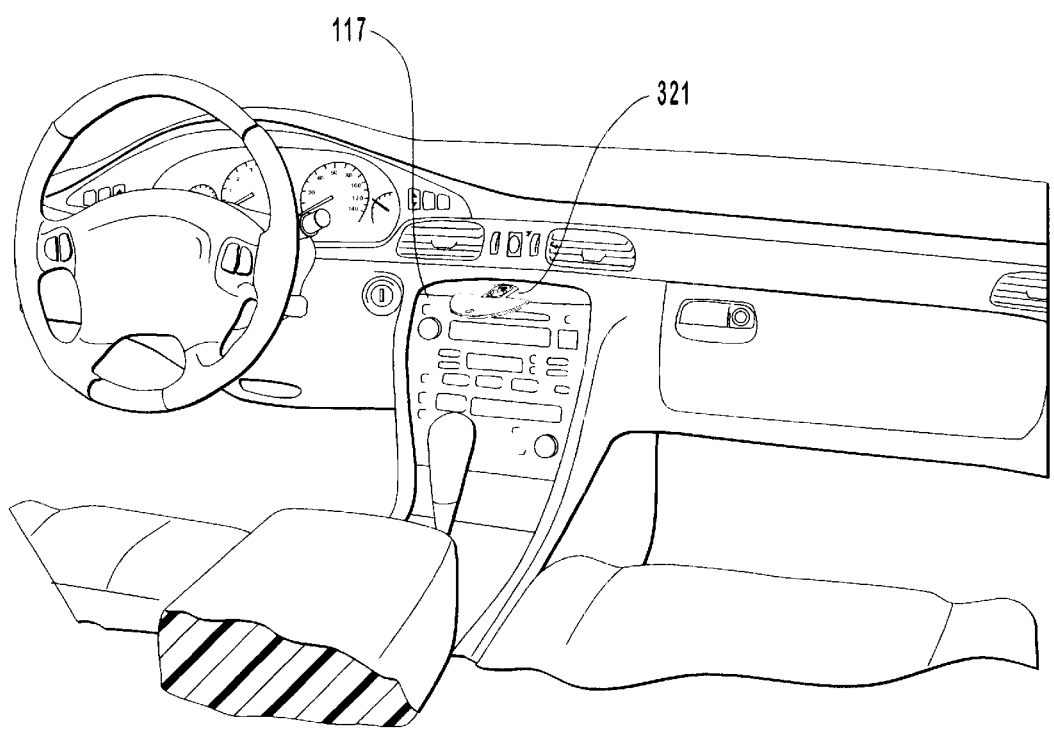
FIG. 14 is a perspective view of a secure key inserted into an insert slot of a dashboard of an automobile.

Depicted in FIG. 11 is a pager 113 having a secure key 317 inserted into an insertion slot in pager 113, where a cut away view is seen of conductors encased within a portion of secure key 317. FIG. 12 depicts a television 115 having an insertion slot therein. A secure key 319 has been inserted into the insertion slot of television 115. Depicted in FIG. 13 is a mobile telephone 111 having a secure key 315 inserted in an insertion slot thereof. Finally, FIG. 14 depicts an automobile electrical communication panel 117 having an insertion slot therein. A secure key 321 has been inserted into the insertion slot of automobile electrical communication panel 117 so as to establish therebetween electrical communication. A contemplated automotive application of representative of FIG. 14 is that the engine of an automobile would be prevented from being started unless a secure key 321 is inserted into an automobile electrical communication panel and the code matching and updating security criteria disclosed herein are met.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An access system to a computing environment, the system comprising:
   a computerized apparatus including:
      program memory means for storing a BIOS and an operating system;
      processing means electrically connected to the program memory means for executing the BIOS and the operating system stored in the program memory means;
   a security interface device in electrical communication with the computerized apparatus and comprising:
      a universal connector means for receiving a connection to a cable;
      a program storage means for storing a plurality of cable identification codes;
      processing means electrically connected to the program storage means and the universal connector means for receiving a cable identification signal from the universal connector means and comparing the signal to the cable identification codes stored in the program storage means;
      a read only memory containing a first identification code;
      a random access memory containing a second identification code;
   a security access device comprising:
      a read only memory containing a first identification code and a cable identification code;
      means for communicating the cable identification code in a cable identification signal to the universal connector means;
      a random access memory containing a second identification code;
      a cable connector for operably and detachably connecting the security interface device to the universal connector means of the security interface device;
   wherein, when the processing means receives a cable identification signal from the universal connector means that matches a cable identification code that is stored in the program storage means, the processing means loads and executes the BIOS to perform the steps of:
      reading the first and and second identification codes from the security interface device and the security access device;
      performing a first comparison of the first and second identification codes from the security interface device, respectively, to the first and second identification codes from the security access device; and
      when said first comparison is not a match, preventing the BIOS from loading or executing of the operating system.

2. The system as defined in claim 1, wherein the BIOS has stored therein a first and a second identification code, and when said first comparison is a match, the processing means performs the steps of:
   reading the first and second identification codes from each of the security interface device, the security access device, and the BIOS;
   performing a second comparison of the first and second identification codes, respectively, among each of the security interface device, the security access device, and the BIOS;
   when the second comparison is a match, said processing means initiating the loading of the operating system.

3. The system as defined in claim 2, wherein the operating system has stored therein a first and a second identification code, and when said second comparison is a match, the processing means performs the steps of:
   reading the first and second identification codes from each of the security interface device, the security access device, BIOS, and the operating system;
   performing a third comparison of the first and second identification codes, respectively, among each of the security interface device, the security access device, the BIOS, and the operating system;
   when the third comparison is a match, said processing means performing the steps of:
      generating a random number, encrypting the random number and storing the result in the second identification code of each of the security interface device, the security access device, the BIOS, and the operating system; and completing the loading of the operating system.

4. The system as defined in claim 3, wherein:

the security access device further comprises a diagnostic output device;

when the third comparison is a match and said processing means finishes the loading of the operating system, the processing means initiates an output at the diagnostic output device of the security access device.

5. The system as defined in claim 3, wherein the computerized apparatus further comprises:

data stored a file in a data storage means, said file including a first identification code;

a user interface for user to access said file;

wherein when the first identification code of the file matches the first identification code in each of the security interface device, the security access device, the BIOS, and the operating system, then said user interface allowing said user access said file.

6. The system as defined in claim 1, wherein:

the computerized apparatus is selected from the group consisting of a personal computer, a PDA, a copy machine, a facsimile machine, a mobile telephone, a pager, a television, and an automobile;

the security interface device is selected from the group consisting of a standalone modem, a PCMCIA card, and an ASIC; and the universal connector means and the cable connector are both physical/electrical media connectors selected from the group consisting of Registered Jack (RJ) connectors, Recommended Standard (RS) connectors, and 15 pin connectors.

7. The system as defined in claim 1, wherein:

the computerized apparatus is a personal computer; and the security interface device is a PCMCIA card that includes therein at least one of a modem and an adaptor circuit for connecting the PCMCIA card to a network of computers.

8. An access system to a computing environment, the system comprising:

a computerized apparatus including:
    an electronic memory for storing an operating system, a plurality of cable identification codes, a first identification code, and a second identification code;
    a universal connector for receiving and making an electrical connection to a cable;
    an electronic processor electrically connected:
        to the electronic memory for executing the operating system; and
        to the memory and the universal connector for receiving a cable identification signal from the universal connector and comparing a code carried in the signal to the cable identification codes stored in the memory;

a security key cable comprising:
    an electronic memory for storing a first identification code, a second identification code, and a cable identification code;
    a cable connector for operably and detachably connecting the security key cable to the universal connector of the computerized apparatus;
    circuitry for communicating the cable identification code in the memory of the security key cable via a cable identification signal to the universal connector of the security key cable;

wherein, when the electronic processor receives a cable identification signal from the universal connector of the electronic processor carrying a code that matches a cable identification code that is stored in the memory of the computerized apparatus, the electronic processor performs the steps of:
    reading the first and and second identification codes from each of the memory of the computerized apparatus and the security key cable;
    performing a comparison of the first and second identification codes from the computerized apparatus, respectively, to the first and second identification codes from the security key cable to determine if there is a match;
    when the comparison is a match, said electronic processor generating a random number, encrypting the random number, and storing the encrypted random number in the second identification code of each of the memory of the computerized apparatus and the memory of the security key cable, the processor completes the loading of the operating system; and
    when said comparison is not a match, the processor will not complete the loading of the operating system.

9. The system as defined in claim 8, wherein:

the security key cable further comprises a diagnostic output device in electrical communication with the circuitry of the security key cable; and when the comparison is a match and the processor completes the loading of the operating system, the circuitry of the security key cable initiates an output at the diagnostic output device of the security key cable.

10. The system as defined in claim 9, wherein the computerized apparatus further comprises:

data stored in a file on a magnetic media storage device, said file also including a first identification code; and a user interface for a user to access said file;

wherein when:
    the comparison is a match and the processor completes the loading of the operating system; and
    the first identification code stored in the file matches the first identification code in each of the memory of the computerized apparatus and the memory of the security key cable, then the user can access said file via said user interface.

11. The system as defined in claim 8, wherein:

the computerized apparatus is selected from the group consisting of a personal computer, a portable computer, a palm top computer, a PDA, a copy machine, a facsimile machine, a standalone modem, a mobile telephone, a pager, a television, and an automobile; and the universal connector and the cable connector are both physical/electrical media connectors selected from the group consisting of Registered Jack (RJ) connectors, Recommended Standard (RS) connectors, and 15 pin connectors.

12. A computer security system comprising:

a general purpose computer including:
    an electronic memory for storing a BIOS and an operating system;
    a central processing unit (CPU) electrically connected to the electronic memory for executing the BIOS and the operating system;

a receptacle for receiving and making an electrical connection to a PCMCIA card;

a PCMCIA card received within the receptacle and in an electrical connection with the computer, said PCMCIA card including:
  a universal connector for receiving and making an electrical connection to a cable;
  an electronic memory for storing a plurality of cable identification codes, a first identification code, and a second identification code;
  firmware electrically connected to the memory of the PCMCIA card and the universal connector for receiving a cable identification signal from the universal connector and comparing a code carried in the signal to the cable identification codes stored in the memory of the PCMCIA card;

a security key cable comprising:
  an electronic memory for storing a first identification code, a second identification code, and a cable identification code;
  a cable connector for operably and detachably connecting the security key cable to the universal connector of the PCMCIA card;
  circuitry for communicating the cable identification code in the memory of the security key cable via a cable identification signal to the universal connector of the security key cable;
  wherein, when the firmware receives a cable identification signal from the universal connector of the PCMCIA carrying a code that matches a cable identification code that is stored in the memory of the PCMCIA card, the CPU loads and executes the BIOS to perform the steps of:
    reading the first and and second identification codes from the PCMCIA card and the security key cable;
    performing a first comparison of the first and second identification codes from the PCMCIA card, respectively, to the first and second identification codes from the security key cable to determine if there is a match; and
    when said first comparison is not a match, the BIOS preventing the CPU from loading of the operating system.

13. The system as defined in claim 12, wherein the BIOS has stored therein a first and a second identification code, and when said first comparison is a match, the CPU performs the steps of:
  reading the first and second identification codes from each of the PCMCIA card, the security key cable, and the BIOS;
  performing a second comparison of the first and second identification codes, respectively, among each of the PCMCIA card, the security key cable, and the BIOS to determine if there is a match;
  when the second comparison is a match, initiating the loading the operating system; and
  when the second comparison is not match, the computer preventing the loading of the operating system.

14. The system as defined in claim 13, wherein the operating system has stored therein a first and a second identification code, and when said second comparison is a match, the CPU performs the steps of:
  reading the first and second identification codes from each of the PCMCIA card, the security key cable, BIOS, and the operating system;
  performing a third comparison of the first and second identification codes, respectively, among each of the PCMCIA card, the security key cable, the BIOS, and the operating system to determine if there is a match;
  when the third comparison is a match, said CPU performing the steps of:
    generating a random number, encrypting the random number, and storing the encrypted random number in the second identification code of each of the PCMCIA card, the security key cable, the BIOS, and the operating system; and
    completing the loading of the operating system.

15. The system as defined in claim 14, wherein the computer further comprises:
  data stored in a file on a magnetic media storage device, said file also including a first identification code; and
  a user interface for a user to access said files;
  wherein when the first identification code stored in the file matches the first identification code in each of the PCMCIA card, the security key cable, the BIOS, and the operating system, then the computer permits said user access to said file via said user interface.

16. The system as defined in claim 14, wherein:
  the security key cable further comprises a diagnostic output device;
  when the third comparison is a match and said CPU completes the loading of the operating system, the firmware of the security key cable initiates an output at the diagnostic output device of the security key cable.

17. The system as defined in claim 15, wherein when the diagnostic output device of the security key cable has an output, a user can remove the security key cable from electrical communication with the PCMCIA card without interrupting the execution of the operating system.

18. The system as defined in claim 12, wherein:
  the general purpose computer is selected from the group consisting of a personal computer, a portable computer, a palm top computer, and a PDA; and
  the universal connector and the cable connector are both physical/electrical media connectors selected from the group consisting of Registered Jack (RJ) connectors, Recommended Standard (RS) connectors, and 15 pin connectors.

19. The system as defined in claim 12, wherein the PCMCIA card includes therein a modem.

20. The system as defined in claim 19, wherein the PCMCIA card further includes therein an adaptor circuit for connecting the PCMCIA card to a network of computers.

* * * * *

UNITED STATES PATENT AND TRADEMARK OFFICE
CERTIFICATE OF CORRECTION

PATENT NO. : 6,275,933 B1
DATED : August 14, 2001
INVENTOR(S) : Michael Fine and Randy Rollins It is certified that error appears in the above-identified patent and that said Letters Patent is hereby corrected as shown below:

Column 1,
Line 20, after "data" delete "in"
Line 47, before "these measures" insert -- of --

Column 4,
Line 3, before "explained" change "described,and" to -- described and --
Line 32, before "card" delete "architecture"

Column 6,
Line 8, before "hand-held" insert -- a --

Column 7,
Line 67, after "200" change "an" to -- to --

Column 10,
Line 52, after "modem" change "10" to -- 110 --

Column 11,
Line 54, before "an operating" change "storin" to -- storing --

Column 12,
Line 14, after "first" delete "and"

Column 14,
Line 28, after "first" delete "and"

Column 16,
Line 9, after "first" delete "and"

UNITED STATES PATENT AND TRADEMARK OFFICE
CERTIFICATE OF CORRECTION

PATENT NO. : 6,275,933 B1
DATED : August 14, 2001
INVENTOR(S) : Michael Fine and Randy Rollins It is certified that error appears in the above-identified patent and that said Letters Patent is hereby corrected as shown below:

<u>Column 17,</u>
Line 34, after "first" delete "and"
Line 58, before "match" insert -- a --

Signed and Sealed this

Twenty-third Day of July, 2002

Attest:

JAMES E. ROGAN
*Attesting Officer*   *Director of the United States Patent and Trademark Office*